M. R. SMITH.
VAPORIZER FOR ENGINES.
APPLICATION FILED SEPT. 29, 1917.
1,267,924.
Patented May 28, 1918.
2 SHEETS—SHEET 2.
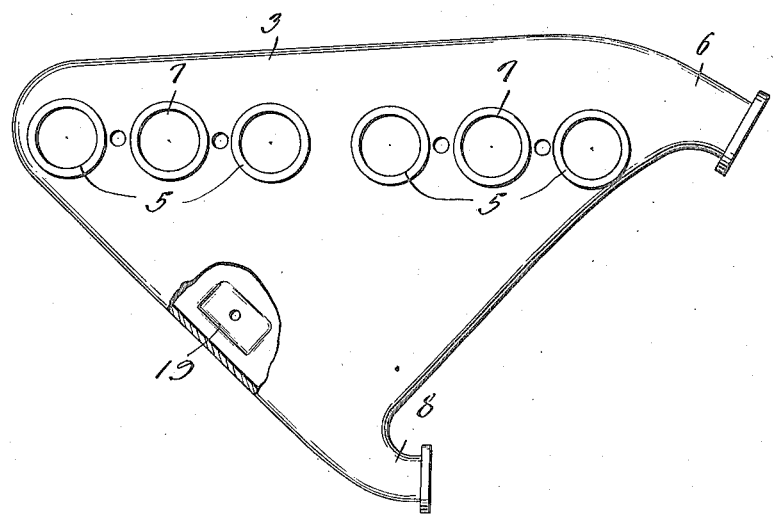
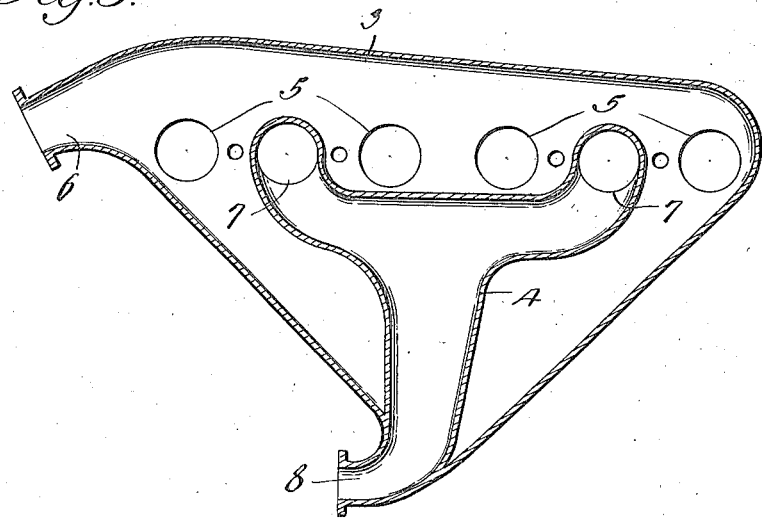
Witness
Inventor
M. R. Smith,
By Victor J. Evans
Attorney

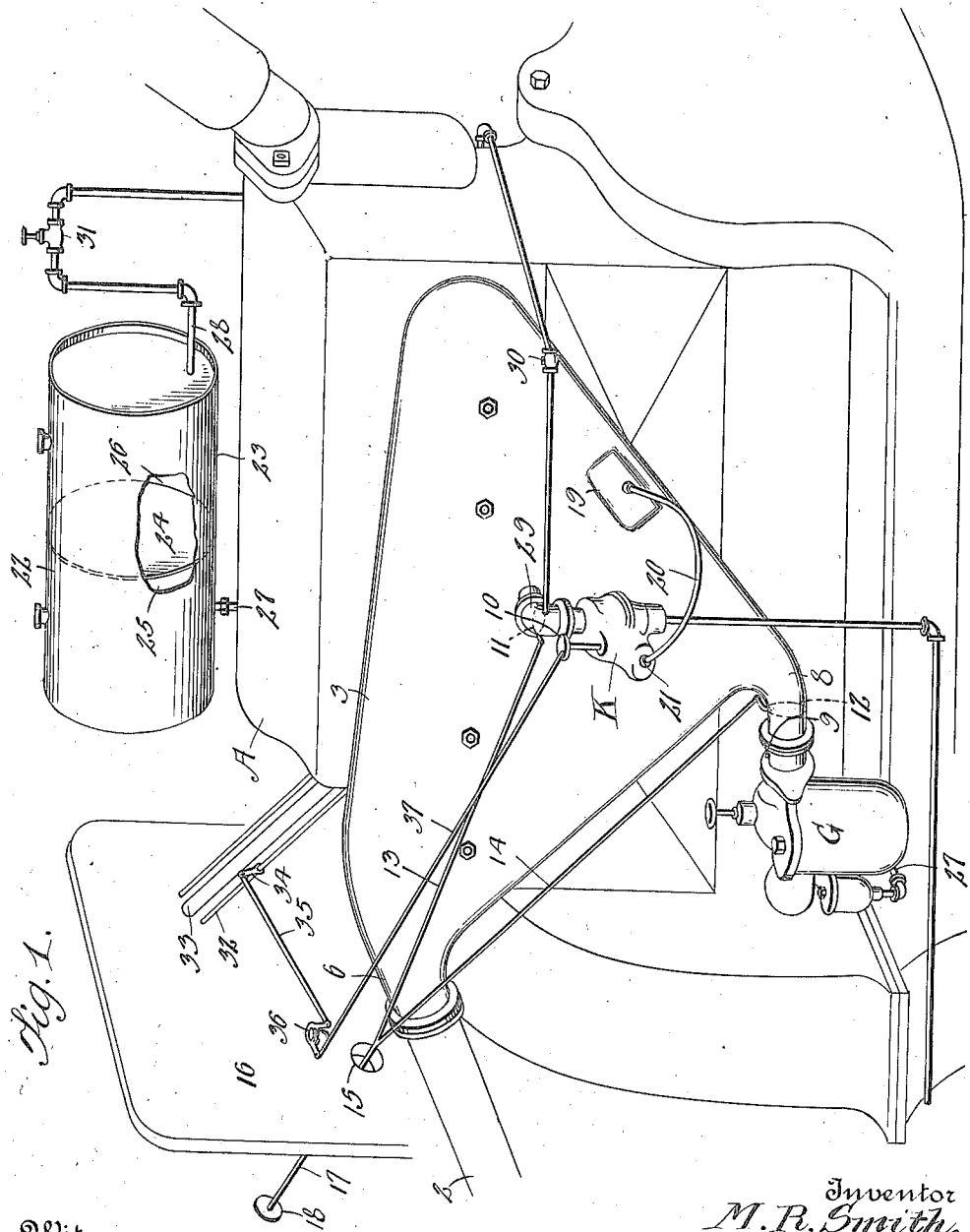

UNITED STATES PATENT OFFICE.

MILTON R. SMITH, OF DWIGHT, ILLINOIS, ASSIGNOR OF TWO-FIFTHS TO JENS J. KNUDSEN, OF DWIGHT, ILLINOIS.

VAPORIZER FOR ENGINES.

1,267,924.   Specification of Letters Patent.   Patented May 28, 1918.

Application filed September 29, 1917.   Serial No. 194,058.

*To all whom it may concern:*

Be it known that I, MILTON R. SMITH, a citizen of the United States, residing at Dwight, in the county of Livingston and State of Illinois, have invented new and useful Improvements in Vaporizers for Engines, of which the following is a specification.

This invention relates to vaporizers for internal combustion engines and the particular object in view is to provide means for highly heating and vaporizing hydrocarbon such as kerosene.

While the vaporizer will hereinafter be referred to as particularly adapted for kerosene, it must be understood that it is also adapted to use other hydrocarbons of a lower grade than gasolene. The improved vaporizer is also adapted to operate as well in the winter season as in the summer.

One of the principal objects of the present invention is to provide novel and efficient means for heating the kerosene while in the carbureter, not depending entirely upon heating the kerosene between the time it leaves the carbureter and the time it reaches the combustion chamber or chambers of the engine.

With the above and other objects in view, the invention consists in the novel construction, combination and arrangement of parts herein fully described, illustrated and claimed.

In the accompanying drawings:—

Figure 1 is a side elevation of an internal combustion engine showing the improved device in its applied relation thereto.

Fig. 2 is an elevation of the vaporizer or manifold looking toward the side thereof adjacent to the engine.

Fig. 3 is a vertical longitudinal section through the vaporizer or manifold.

Referring to the drawings A generally designates an internal combustion multiple cylinder engine and 2 the exhaust pipe leading therefrom.

In carrying out the present invention, I construct the exhaust manifold 3 in triangular formation and entirely inclose the intake manifold 4 therein, the exhaust manifold and the intake manifold being preferably cast integrally with each other and the exhaust manifold or shell of the vaporizer being considerably larger than the intake manifold as clearly illustrated in the drawings in order that the hot exhaust gases from the engine may be circulating all around the intake manifold and thereby bring to a high temperature the fuel and air admitted through the intake manifold to the engine.

The shell or body 3 of the vaporizer is formed with a number of exhaust inlet orifices 5 corresponding with the number of exhaust ports of the engine and therefore the hot exhaust gases are admitted to the shell or body 3 at numerous points throughout the length thereof thus adding to the efficiency of the vaporizer as a whole. At one end the vaporizer body terminates in an outlet neck 6 to which is attached the exhaust pipe 2. The shell or body 3 is also provided with other orifices 7 corresponding with the location of the branches of the intake manifold and the inlet ports of the engine.

The body or shell 3 is further provided with an inlet neck 8 at the bottom thereof to which is connected a carbureter G for gasolene or other highly volatile liquid fuel. Connected to the body or shell 3 adjacent to the center thereof is a lower grade hydrocarbon carbureter K hereinafter referred to as the kerosene carbureter. The carbureter G is provided with the usual throttle valve 9 and the kerosene carbureter K is likewise provided with the usual throttle valve 10. The last named carbureter is also provided with a cut off valve 11 located beyond the throttle valve 10 and in a like manner the gasolene carbureter G is equipped with a cut off valve 12 located beyond the throttle valve 9. Valve operating rods 13 and 14 are connected to the arms of the valves 11 and 12 and extend rearwardly through an opening 15 in the dash 16 of an automobile in motor car practice, the rods 13 and 14 being connected to a common operating rod 17 having suitable head or hand grip thereon within reach of the operator of the machine. The arms of the valves 11 and 12 are so arranged that when the operator pulls on the rod 17, the valve 12 is opened and simultaneously the valve 11 is closed. When the operator pushes on the rod 17 the valve 11 is opened and simultaneously the valve 12 is closed. This enables the operator to simultaneously cut off the gasolene carbureter and throw the kerosene carbureter into operation, this being done after the engine has been primarily run for a sufficient time to heat the intake manifold and raise the temperature to the requisite degree. Actual tests have shown that it requires only from thirty to sixty seconds to heat the intake manifold sufficiently to effectively vaporize the fuel in the intake manifold.

The body or shell of the vaporizer comprises an offset pocket or chamber 19 directly communicating with the interior thereof and from said pocket or chamber 19, a flexible pipe 20 extends to the air intake 21 of the kerosene carbureter K. Thus highly heated air is admitted to the kerosene carbureter so as to heat the fuel therein before passing into the intake manifold. This adds greatly to the efficiency of the device as a whole.

22 represents an auxiliary tank shown as of cylindrical formation and mounted above the engine so as to obtain the required fall to maintain the proper feed of the contents thereof to the engine. The tank 23 contains a partition 24 between the ends thereof dividing said tank into a fuel chamber 25 adapted to contain gasolene for example, and a water chamber 26. A pipe 27 leads from the chamber 25 to the gasolene carbureter G, and another pipe 28 leads from the water chamber 26 to the connection 29 between the kerosene carbureter and the intake manifold. The pipe 28 contains a check valve 30 and a regulating valve 31, enabling the flow of water to be regulated to suit conditions. The water is used to keep the engine cool and also to soften and remove carbon deposits therein thus adding to the general efficiency of the engine and requiring the latter to be cleaned more infrequently.

The throttle valve 10 of the kerosene carbureter K is operated simultaneously with the throttle valve 9 of the gasolene carbureter G by providing the throttle rod 32 which extends along the steering column 33 with an arm 34 which is connected by a link 35 to a bell crank lever 36. A rod 37 extends from said bell crank lever 36 to the arm of the throttle valve 10. The usual connections extend from the throttle rod 32 to the throttle valve 9 of the carbureter G. The simultaneous operation of both throttle valves will of course not affect the carbureter in use and which has been cut off from communication with the engine by its respective cut off valve 11 or 12 as the case may be. As only a small amount of gasolene is required to start and operate the engine for a short period of time, the tank 23 may be made quite small, having a capacity for example of two gallons, one gallon of gasolene and one gallon of water. Water from the radiator is not used for the purpose of cooling the engine as it is dirty and therefore undesirable. By providing the water chamber 26, a clean supply of water is insured for the purpose set forth.

I claim:—

1. Means for vaporizing hydrocarbon fuel, comprising an exhaust manifold of triangular formation having an inlet neck for a gasolene carbureter and outlet neck for attachment to the exhaust pipe of an engine, an intake manifold contained entirely within said exhaust manifold, a kerosene carbureter having communication with the intake manifold and located about centrally of the exhaust manifold, a cut off for the gasolene carbureter, another cut off for the kerosene carbureter, and manually controlled means for simultaneously opening one of said cut offs and closing the other cut off.

2. Means for vaporizing hydrocarbon fuel, comprising an exhaust manifold of triangular formation having an inlet neck for a gasolene carbureter and an outlet neck for attachment to the exhaust pipe of an engine, an intake manifold contained entirely within said exhaust manifold, a kerosene carbureter having communication with the intake manifold and located about centrally of the exhaust manifold, a cut off for the gasolene carbureter, another cut off for the kerosene carbureter, manually controlled means for simultaneously opening one of said cut offs and closing the other cut off, and a pipe having one end in communication with the exhaust manifold and the other end in communication with the air intake of the kerosene carbureter.

3. Means for vaporizing hydrocarbon fuel, comprising an exhaust manifold of triangular formation having an inlet neck for a gasolene carbureter and an outlet neck for attachment to the exhaust pipe of an engine, an intake manifold contained entirely within said exhaust manifold, a kerosene carbureter having communication with the intake manifold and located about centrally of the exhaust manifold, a cut off for the gasolene carbureter, another cut off for the kerosene carbureter, manually controlled means for simultaneously opening one of said cut offs and closing the other cut off, a water supply tank, a pipe leading from said tank to the kerosene carbureter between the throttle valve thereof and the engine, and means for regulating the flow of water through said pipe.

In testimony whereof I affix my signature.

MILTON R. SMITH.